United States Patent
Cote et al.

(10) Patent No.: US 7,497,004 B2
(45) Date of Patent: Mar. 3, 2009

(54) PROCESS FOR MAKING UHF ANTENNAS FOR EAS AND RFID TAGS AND ANTENNAS MADE THEREBY

(75) Inventors: Andre Cote, Williamstown, NJ (US); Detlef Duschek, Sensbachtal (DE)

(73) Assignee: Checkpoint Systems, Inc., Thorofare, NJ (US)

( * ) Notice: Subject to any disclaimer, the term of this patent is extended or adjusted under 35 U.S.C. 154(b) by 223 days.

(21) Appl. No.: 11/400,893

(22) Filed: Apr. 10, 2006

(65) Prior Publication Data
US 2007/0234553 A1     Oct. 11, 2007

(51) Int. Cl.
*H01P 11/00*     (2006.01)
(52) U.S. Cl. .......................... 29/600; 29/592.1; 29/601; 343/700 MS; 343/786; 156/277
(58) Field of Classification Search .................. 29/600, 29/601, 831, 832; 343/700 MS, 895, 809; 340/572.1–572.5, 10.33; 156/272.2, 220, 156/277
See application file for complete search history.

(56) References Cited

U.S. PATENT DOCUMENTS

| | | | |
|---|---|---|---|
| 3,497,410 A | 2/1970 | Zagusta et al. | |
| 3,678,577 A | 7/1972 | Weglin | |
| 3,713,944 A | 1/1973 | Dennis et al. | |
| 4,495,232 A | 1/1985 | Bauser et al. | |
| 4,555,291 A * | 11/1985 | Tait et al. ..................... | 156/250 |
| 4,846,922 A | 7/1989 | Benge et al. | |
| 4,900,386 A * | 2/1990 | Richter-Jorgensen ....... | 156/250 |
| 4,900,486 A | 2/1990 | Derakhshani et al. | |
| 4,910,499 A | 3/1990 | Benge et al. | |
| 4,914,079 A * | 4/1990 | Takei et al. ................. | 503/227 |
| 4,954,814 A | 9/1990 | Benge | |
| 5,174,847 A | 12/1992 | Pichl | |
| 5,362,374 A | 11/1994 | Chang | |
| 5,645,932 A | 7/1997 | Uchibori | |
| 5,759,422 A | 6/1998 | Schmelzer et al. | |
| 5,829,121 A | 11/1998 | Shoemaker et al. | |
| 5,899,144 A | 5/1999 | Parks | |
| 6,214,444 B1 | 4/2001 | Uchibori | |
| 6,383,616 B1 | 5/2002 | Uchibori | |
| 6,458,465 B1 | 10/2002 | Uchibori | |

(Continued)

OTHER PUBLICATIONS

International Search Report, PCT/US2007/066098, dated Oct. 4, 2007.

*Primary Examiner*—Minh Trinh
(74) *Attorney, Agent, or Firm*—Caesar, Rivise, Bernstein, Cohen & Pokotilow, Ltd.

(57) ABSTRACT

A method of making UHF antennas for security tag and antennas thereby. A web of electrically conductive material having a thickness in the range of approximately 5 to approximately 50 microns is releasably secured to a carrier web using a releasably securable adhesive substantially coextensive with the conductive web. A series of antennas of a desired shape are die-cut into the conductive web, but not into the carrier web. The portion of the conductive web not making up the antennas is in the form of scrap and is removed, thereby leaving the series of antennas releasably secured to the carrier sheet. The antennas are arranged to be removed from the carrier sheet, whereupon the releasably securable adhesive is transferred to them, so that they may be subsequently secured to other components to form a security tag.

10 Claims, 3 Drawing Sheets

U.S. PATENT DOCUMENTS

| | | |
|---|---|---|
| 6,618,939 B2 | 9/2003 | Uchibori et al. |
| 6,988,666 B2 | 1/2006 | Appalucci et al. |
| 7,109,867 B2 | 9/2006 | Forster |
| 7,236,093 B2 * | 6/2007 | Stromberg ............... 340/572.8 |
| 7,256,738 B2 * | 8/2007 | Uchibori et al. ....... 343/700 MS |
| 2002/0025416 A1 | 2/2002 | Uchibori |
| 2004/0025324 A1 | 2/2004 | Uchibori et al. |
| 2005/0183264 A1 | 8/2005 | Eckstein et al. |

* cited by examiner

PROCESS FOR MAKING UHF ANTENNAS FOR EAS AND RFID TAGS AND ANTENNAS MADE THEREBY

BACKGROUND OF THE INVENTION

1. Field of Invention

The current invention relates to EAS and RFID security tags and more particularly to methods of making UHF antennas for such tags and antennas made thereby.

2. Description of Related Art

RFID tags may be either active or passive. Active tags include their own on-board power, whereas passive use radio frequency signals from a transmitter to power the tag. When a passive tag receives the signal from the incident electromagnetic field, its antenna absorbs the energy received and directs it to an integrated circuit forming a part of the tag. The incident electromagnetic may contain data or instructions encoded into the signal. Using a portion of the energy received, the integrated circuit can then communicate back to a reader the details of data stored in the integrated circuit's on-board memory. The distance at which an RFID tag can be read/write depends on the output power of the RFID reader, the surrounding environment, and the efficiency with which the RFID tag interacts with the incident electromagnetic field. Thus, RFID tags are arranged to operate in various frequency bands, depending upon the application and the operating distance desired. One of those bands is the ultra high frequency ("UHF") band of 850 MHz to 960 MHz. At present in the United States the UHF frequency for such tags is 915 MHz, in Europe it is 868 MHz and in Japan it is 956 MHz.

The manufacture or production of antennas for EAS and/or RFID tag applications on the most cost effective basis has been a desired goal of the industry for many years and the patent literature is replete with examples of systems and methods to produce antennas on a low cost basis. Examples of such patented systems/methods are found in: U.S. Pat. No. 3,497,410 (Zagusta et al.); U.S. Pat. No. 3,678,577 (Weglin et al.); U.S. Pat. No. 3,713,944 (Dennis); U.S. Pat. No. 4,495,232 (Bauser et al.); U.S. Pat. No. 4,846,922 (Benge et al.); U.S. Pat. No. 4,900,486 (Derakhshani et al.); U.S. Pat. No. 4,910,499 (Benge et al.); U.S. Pat. No. 4,954,818; (Benge et al.); U.S. Pat. No. 5,174,847 (Pichl); U.S. Pat. No. 5,362,374 (Chang); U.S. Pat. No. 5,645,932 (Uchibori); U.S. Pat. No. 5,829,121 (Shoemaker et al.); U.S. Pat. No. 5,759,422 (Schmelzer et al.); U.S. Pat. No. 5,899,144 (Parks); U.S. Pat. No. 6,214,444 (Uchibori); U.S. Pat. No. 6,383,616 (Uchibori); U.S. Pat. No. 6,458,465 (Uchibori); and U.S. Pat. No. 6,618,939 (Uchibori).

In U.S. Pat. No. 6,988,666 (Appalucci, et al.), entitled "Security Tag and Process for Making Same" which is assigned to the same assignee as this invention and whose disclosure is incorporated by reference herein there is disclosed and claimed a method for producing security tags and components therefor, e.g., coil antennas for HF (high frequency) security tags, on a low cost basis. While the antenna making methods disclosed in this patent are suitable for their intended purposes, those methods are based on applying a patterned adhesive in the shape of the desired component, e.g., the coil antenna, onto a substrate and then die cutting around that pattern. Such action leaves something to be desired from the standpoint of manufacturing simplicity and cost, particularly where the antennas to be created are significantly thinner and simpler in geometry.

As is known UHF antennas can be made as thin as approximately 5 microns, since such antennas operate on the skin effect. Moreover, UHF antennas are typically somewhat simpler in geometry than coil antennas used in HF tags. Accordingly, the techniques of U.S. Pat. No. 6,988,666 (Appalucci et al.) may not be the most cost effective methods for the production of very thin UHF antennas.

Thus, a need exists for a method of producing very thin, UHF antennas for tags on a very low cost basis.

The subject invention addresses that need by making use of some low cost practices and techniques implemented in the label making/converting industry.

BRIEF SUMMARY OF THE INVENTION

A method of producing a very thin, flexible UHF antenna for an EAS or RFID tag. The method basically entails providing a conductor sheet comprising a layer of electrically conductive material having a top surface and an undersurface. The conductor sheet has a thickness in the range of approximately 5 to approximately 50 microns. A liner sheet having a top surface is also provided and the conductor sheet is disposed on the liner sheet so that the undersurface of the conductor sheet is releasably secured to the top surface of the liner sheet by an adhesive substantially coextensive with the conductor sheet. The conductor sheet is formed into a shape desired for the antenna by bringing a cutting die having that desired shape into engagement with the conductor sheet, whereupon the die pierces through the conductor sheet, but not through the liner sheet. This action creates a die-cut antenna having the desired shape and being releasably secured to the liner sheet.

In accordance with a preferred embodiment of the method of this invention the conductor sheet is in the form of a conductive material web and the liner sheet is in the form of a carrier web. With such an arrangement a series of antennas can be die-cut in the conductive material web, but not through the carrier web, whereupon those antennas are surrounded by the portion of the conductive material web outside the peripheries of the series of antennas. The portion of the conductive material web outside the peripheries of the series of antennas constitutes scrap material.

In accordance with one aspect of the foregoing method the scrap material is removed leaving the series of antennas releasably secured to the carrier web. The scrap material can be removed in various ways, e.g., utilizing a take-up reel to remove the scrap material from the carrier web or providing another web (e.g., a scrap removal web). The scrap removal web has a pattern of adhesive thereon corresponding to the shape of the scrap material. The scrap removal web is disposed, e.g., juxtaposed, with respect to the carrier web so that the pattern of adhesive of the scrap removal web is brought into engagement with the scrap material on the carrier web, whereupon relative movement between the scrap removal web and the carrier web causes the scrap material to be transferred from the carrier web to the scrap removal web.

In accordance with another aspect of the subject invention the carrier web can comprise a laminate of the conductor sheet and a reinforcing sheet. The conductor sheet has a top surface and an undersurface. The undersurface of the conductor sheet is secured to the reinforcing sheet. The reinforcing sheet has an undersurface which is releasably secured to the top surface of the carrier web by the adhesive, thereby indirectly securing the conductor sheet to the top surface of the carrier web.

In accordance with still another aspect of this invention the carrier web with the series of antennas adhesively secured thereto is reeled up on a take-up real to enable the antennas to be provided to some system for creating EAS or RFID tags using those antennas. To that end, the antennas are arranged to be removed from the carrier web, whereupon a contiguous portion of the adhesive is transferred from the carrier web to its associated antenna to enable that antenna to be secured to another component by use of the transferred adhesive.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
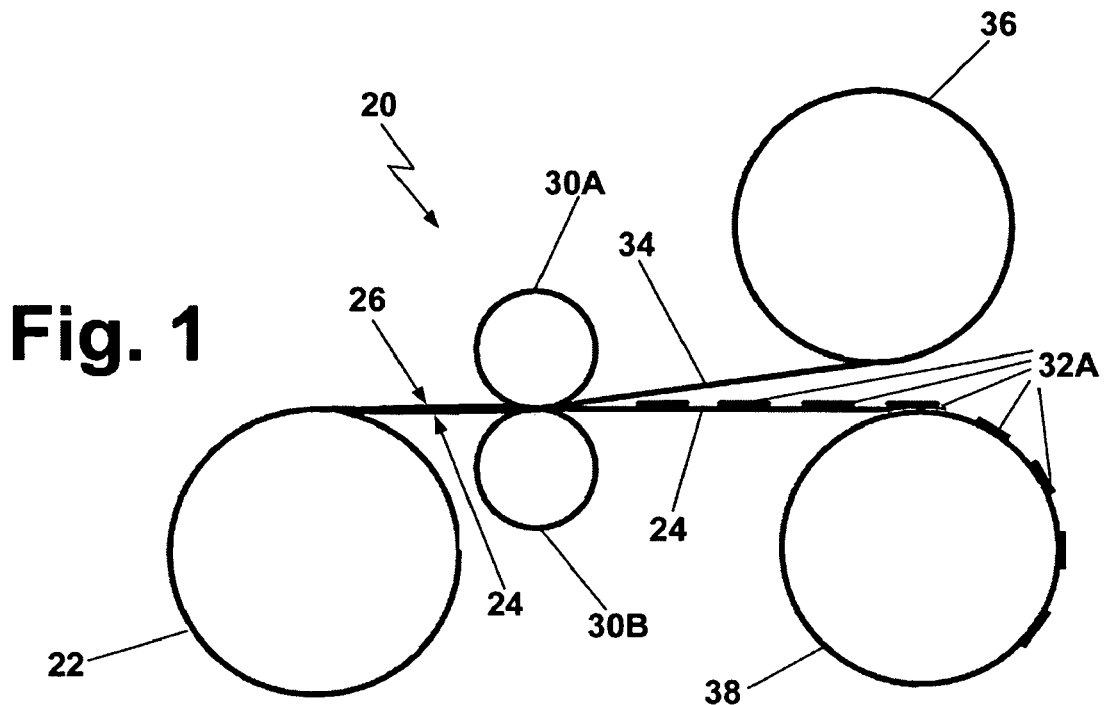
FIG. 1 is a schematic diagram of one exemplary system for producing a series of UHF antennas in accordance with one exemplary method of the subject invention.

Referring now to the various figures of the drawings wherein like reference characters refer to like parts there is shown at 20 in FIG. 1 a system 20 for carrying out one exemplary method of this invention to produce a series of UHF antennas in a very expeditious manner and at a very low cost. As will be appreciated by those skilled in the art from the description to follow, those advantages stem at least partially from the fact that the methods of this invention can be accomplished using standard installed equipment that has been available for several decades in the label converting industry, but modified as will be described below to fabricate UHF antennas.

Figure 2:
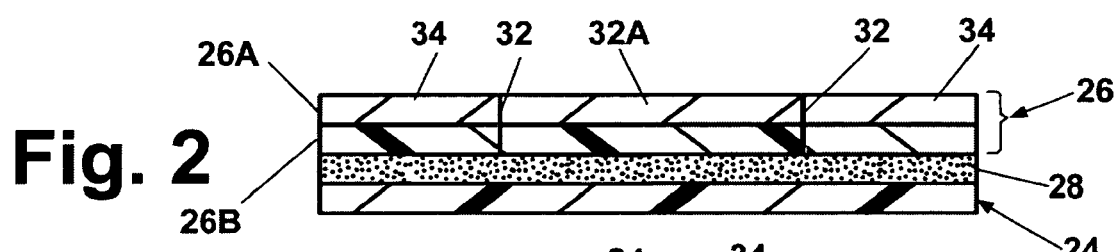
FIG. 2 is an enlarged, longitudinal sectional view of one exemplary embodiment of an electrically conductive web (e.g., a laminate of an electrically conductive sheet or web secured over a reinforcing sheet or web) that is releasably secured on a carrier web and being shown just after being die cut by a portion of the system shown in FIG. 1.
Figure 3:
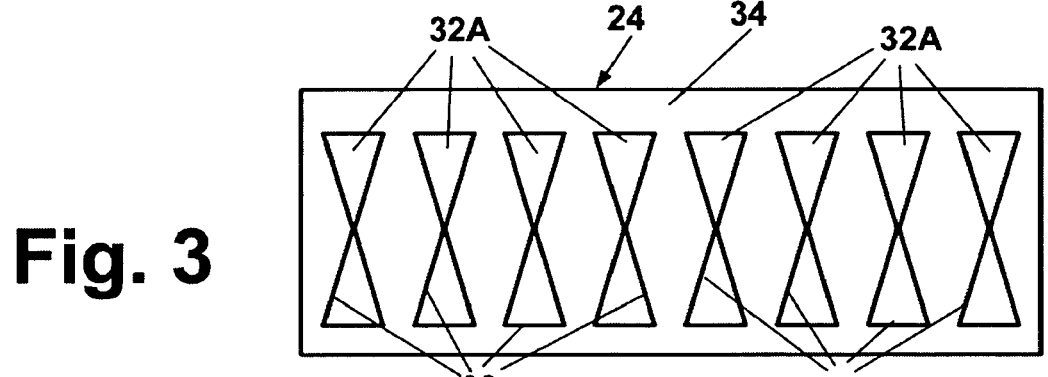
FIG. 3 is a top plan view of a representative section of the carrier web showing a series of exemplary UHF antennas die cut thereon.

The exemplary system 20 of FIG. 1 basically comprises a reel 22 containing a flexible liner or carrier web 24 (FIGS. 1 and 2) and a flexible conductive laminate web 26 (FIGS. 1 and 2) releasably secured to the carrier web by a layer of any suitable adhesive 28 (FIG. 2), e.g., hot melt, or water based systems, using acrylic or rubber based adhesives, converted inline with liner which is a densified kraft paper that is starch coated and siliconized. The laminate web 26, which will be described later, basically comprises an electrically conductive material top layer 26A and a reinforcing material bottom layer 26B secured together by a very thin adhesive layer (not shown). The laminate web 26 and the carrier web 24 are passed as a unit between a die-cutting roller 30A and a backing roller 30B. The die-cutting roller 30A is arranged to die-cut a series of lines 32 (FIGS. 2 and 3) defining a series antenna shapes 32A (FIGS. 2 and 3) through the laminate web 26 and the interposed adhesive 28, but not into the carrier web 24. Thus, the die-cutting roller 30A can be constructed in the same manner as any of the die-cutting rollers of the prior art described above or as any die cutting roller used in the label converting industry, so long as it has the ability to cut a desired pattern through the material that will be used to form the antennas. In fact, the component used to die-cut the antennas need not be a roller, but can be any device capable of cutting through the conductive layer, but not through the carrier web. The shape of the pattern produced by the die-cutting roller (or other die-cutting component) is a matter of design choice, depending upon the geometry of the desired antenna. The die-cutting roller 30A is arranged to rotate about its axis and thereby bring its cutting edges into engagement with the material to be die-cut under pressure applied by the backing roller 30B. This action produces a series of die-cut antennas 32A (see FIG. 3) surrounded by a web-like body of the remaining or complementary portion 34 of the laminate web 26 from which the antennas have been cut. The web like portion 34 of the surrounding laminate material forms scrap of the process. Depending upon the shape of the web of scrap material 34, it may be suitable for subsequent use as part of a security tag, or for other purposes which are compatible with its basic shape. If the shape of the web of scrap material 34 is not suitable for other usage, it can be collected to reclaim the material making it up. In any case the combined laminate web 26 and the carrier web 24 that exits from between the die cutting roller 30A and backing roller 30B is arranged to be separated from the carrier web 24. In particular, the web of the scrap material 34 is pulled away from the carrier web 24 and reeled up on a take-up reel 36, while the carrier web 24 with the series of antennas 32A adhesively secured thereon is reeled up on another take-up reel 38.

As will be appreciated by those skilled in the art, UHF antennas of aluminum or any other suitable electrically conductive material for use in security tags can be extremely thin, e.g., down to approximately 5 microns, owing to the fact that they make use of the "skin effect" for operation. The problem with using such extremely thin materials is in the handling and shaping of a web or layer of that electrically conductive material. Thus, in the exemplary embodiment of FIG. 1, the electrically conductive material making up the web is provided in the form of the heretofore identified reinforced laminate web 26. In that embodiment the conductive layer 26A is aluminum having a thickness of approximately 5 to 10 microns. The reinforcing layer number 26B is tissue paper having a thickness of approximately 15 to 40 microns. The tissue paper and aluminum layer are bonded together by an extremely thin layer of an adhesive (not shown). The foregoing laminate material is readily available and is commonly used for liners in cigarette packages. Thus, a web of such material can be used to form the laminate web 26.

It should be pointed out at this juncture that the laminate web 26 as described above is merely exemplary of various laminate materials that can be used in accordance with this invention. Thus, the conductive material can be any suitable electrical conductor of any thickness within the range of approximately 5 to approximately 50 microns. Depending upon the composition or type of electrically conductive material used and its thickness a reinforcing layer may or may not be necessary. If deemed necessary that layer can be made of any suitable material, e.g., tissue paper, onion skin, wrapping paper, kraft paper, offset, bond, etc., and can be of a thickness in the range of approximately 5 to 100 microns. Examples of other laminates contemplated by this invention are the following; laminates used in juices pouches, gum wrappers, candy wrappers, etc. The laminate may be made by sputtering, electrode positing or applying the conductive material in any other suitable way on the reinforcing web to form what has been referred to as the laminate web.

Figure 4:
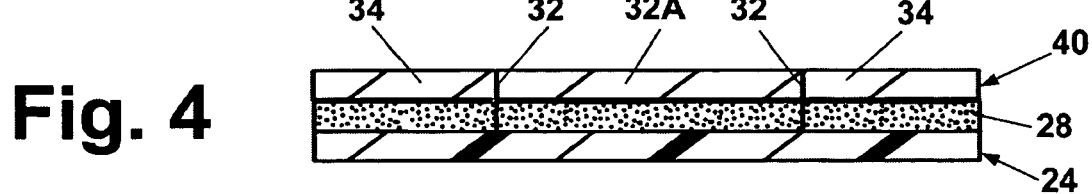
FIG. 4 is a view similar to FIG. 2, but showing a sectional view of an alternative embodiment of the conductive web (e.g., a single electrically conductive sheet or web) that is releasably secured on the carrier web and being shown just after being die cut by a portion of the system shown in FIGS. 1 and 5.

In FIG. 4 there is shown another alternative embodiment of this invention. In that embodiment the antennas are formed out of a single layer of conductive material, i.e., the web from which the antennas are die-cut is not a laminate. Rather it is un-reinforced, and comprises only a single layer of conductive material, such as aluminum.

Before discussing the process of forming UHF antennas from a web of conductive material like that shown in FIG. 4, a description of the carrier web 24 is in order. To that end, irrespective of what type of material is used to form the antennas 32A (i.e., whether the conductive material is in the form of a reinforced laminate web like that of FIG. 2 or an un-reinforced web of a conductive material like that of FIG. 4), the same type of carrier web 24 can be used. That carrier web can be any low cost material which is flexible and which can support the web of conductive material thereon and enable it to be die-cut thereon, without penetrating the carrier web 24. One particularly suitable material is that used in the label converting industry, namely, densified kraft paper that is hardened. The kraft paper making up the liner or carrier web is sprayed with a starch coating for "hold out" purposes and then is covered with silicone. An adhesive 28, such as a hot melt, or water based systems, using acrylic or rubber based adhesives, or any such as typically used to make labels in the global label converting industry, is applied over the entire portion of the surface of the carrier web that will have the conductive laminate web mounted on it. The silicone layer of the carrier web acts as a release agent to enable the release of the adhesive 28, when desired (as will be described later). Thus the adhesive 28 is, in effect, releasably secured to the carrier web, i.e., it can be peeled from the carrier web when the antennas are removed from the carrier web, as will be described later.

Referring now to FIG. 4 the details of the single layer conductive material web embodiment will now be described. As can be seen the web that will be used to form the series of antennas 32A comprises a single layer of aluminum 40 or any other suitable electrically conductive material. The aluminum can have a thickness in the range of from about 50 microns down to about 5 microns. The electrically conductive web is releasably secured to the carrier web 24 by the heretofore identified adhesive 28 so that the entire undersurface of the web 40 is secured to the carrier web. Thus, in this embodiment the conductive web 40 is directly secured to the carrier web, while the conductive layer 26A of the conductive laminate 26 is indirectly secured to the carrier web, i.e., it is secured to the carrier web via the interposed reinforcing layer 26B.

Figure 5:
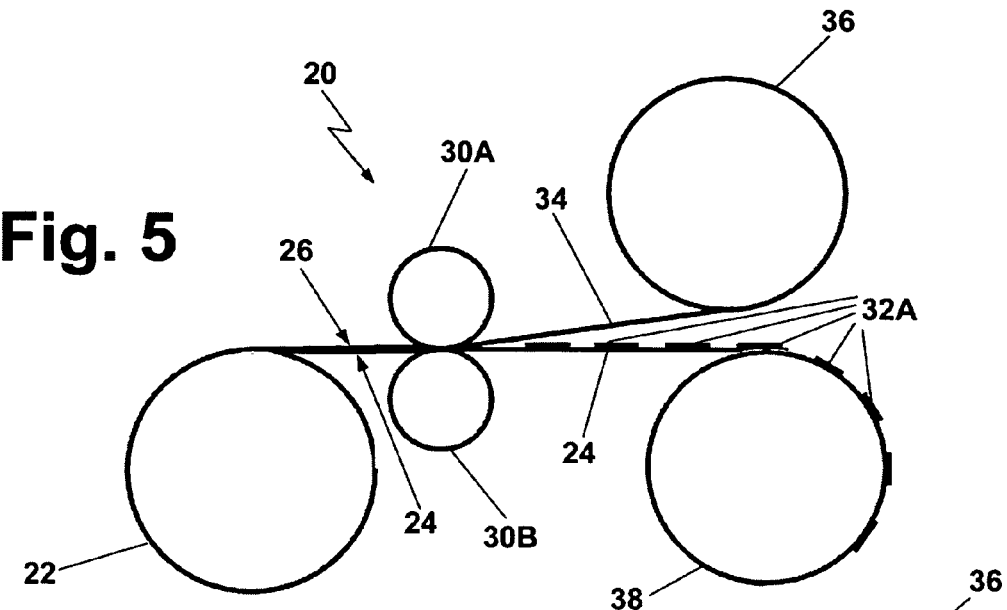
FIG. 5 is a view like FIG. 1, but showing the system used if the conductive web shown in FIG. 4 is sufficiently robust and strong to enable its scrap portions (i.e., portions not making up the series of antennas) to be directly peeled off of the carrier web and reeled up.
Figure 6:
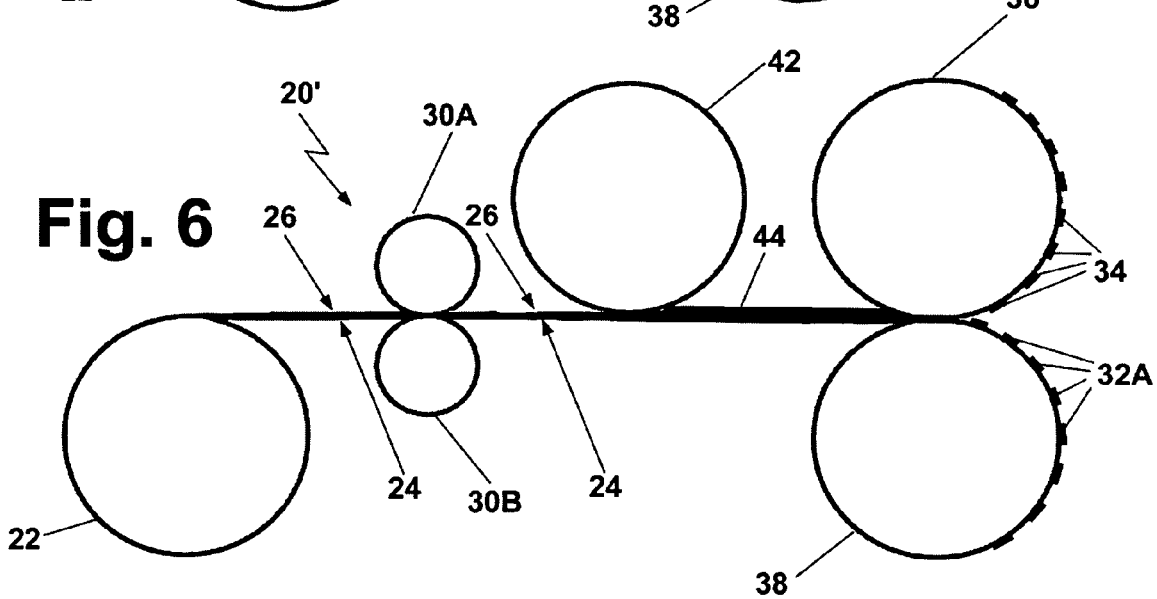
FIG. 6 is a view similar to FIG. 5, but showing an alternative system including a scrap removal web for producing a series of UHF antennas in accordance with a method of the subject invention where the conductive web of FIG. 4 is not sufficiently robust and strong to enable its scrap portions to be directly peeled off.

The formation of the series of antennas 32A from the web material embodiment shown in FIG. 4 is best seen in FIGS. 5 and 6. In FIG. 5 a system 20 is provided that to all intents and purposes is the same as the system 20 discussed above with respect to FIG. 1. Such an arrangement is suitable if the conductive material web 40 is sufficiently strong and robust that it can be pulled away and reeled up in a manner similar to the method described with respect to FIG. 1. Thus, as shown in FIG. 5 the conductive web 40 and the carrier web 24 are passed as a unit between the die-cutting roller 30A and the backing roller 30B. The die-cutting roller 28 die-cuts a series of lines 32 defining a series antenna shapes 32A through the conductive web 26 and the interposed adhesive 28, but not into the carrier web 24. This produces a series of die-cut antennas 32A surrounded by the scrap material of the conductive web 40. As should be appreciated by those skilled in the art the antennas 32A produced from the conductive web 40 by the method shown in FIG. 5 are a single layer thick, whereas the antennas 32A produced from the laminate web 26 of the embodiment of FIG. 1 are of a double thickness, i.e., the conductive layer 26A and the reinforcing layer 26B.

The combined conductive web 40 and the carrier web 24 that exits from between the die cutting roller 30A and backing roller 30B is arranged is separated in the same manner as described with reference to FIG. 1. To that end, the web of the scrap material 34 (which now constitutes only the single conductive material web layer 40) is pulled away from the carrier web 24 and reeled up on the take-up reel 36, while the carrier web 24 with the series of antennas 32A adhesively secured thereon is reeled up on the other take-up reel 38.

Figure 7:
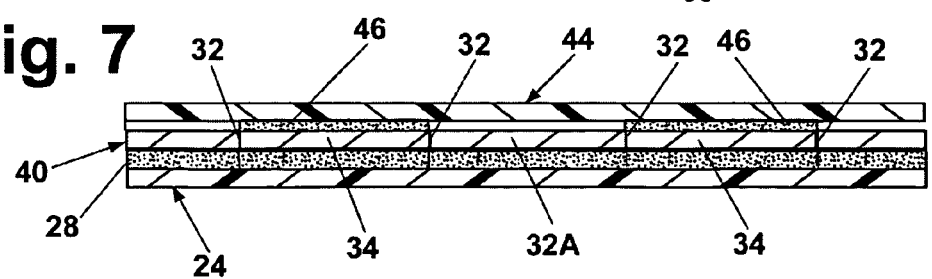
FIG. 7 is an enlarged sectional view of the carrier web with the die cut antennas thereon shown being secured to the scrap removal web of FIG. 6 to enable the scrap material to be removed from the carrier web leaving the series of antennas on the carrier web.

If the conductive web 40 is not sufficiently strong and robust so that it can be pulled away in accordance with the method as discussed with respect to FIG. 5, an alternative system 20' can be used. That alternative system basically comprises the same basic components as found in FIG. 5, plus the addition of a supply roll 42 for another flexible scrap removal web 44. As best seen in FIG. 7, the scrap removal web includes a pattern 46 of adhesive on its undersurface. The pattern 46 corresponds in shape to the shape of the scrap material 34. The adhesive forming the pattern 46 can be any suitable adhesive, e.g., an acrylic or rubber based adhesive that has permanent bonding strength and high initial tack, that has sufficient high tack to effect the removal of the scrap material from the carrier web as will be described later.

Figure 8:
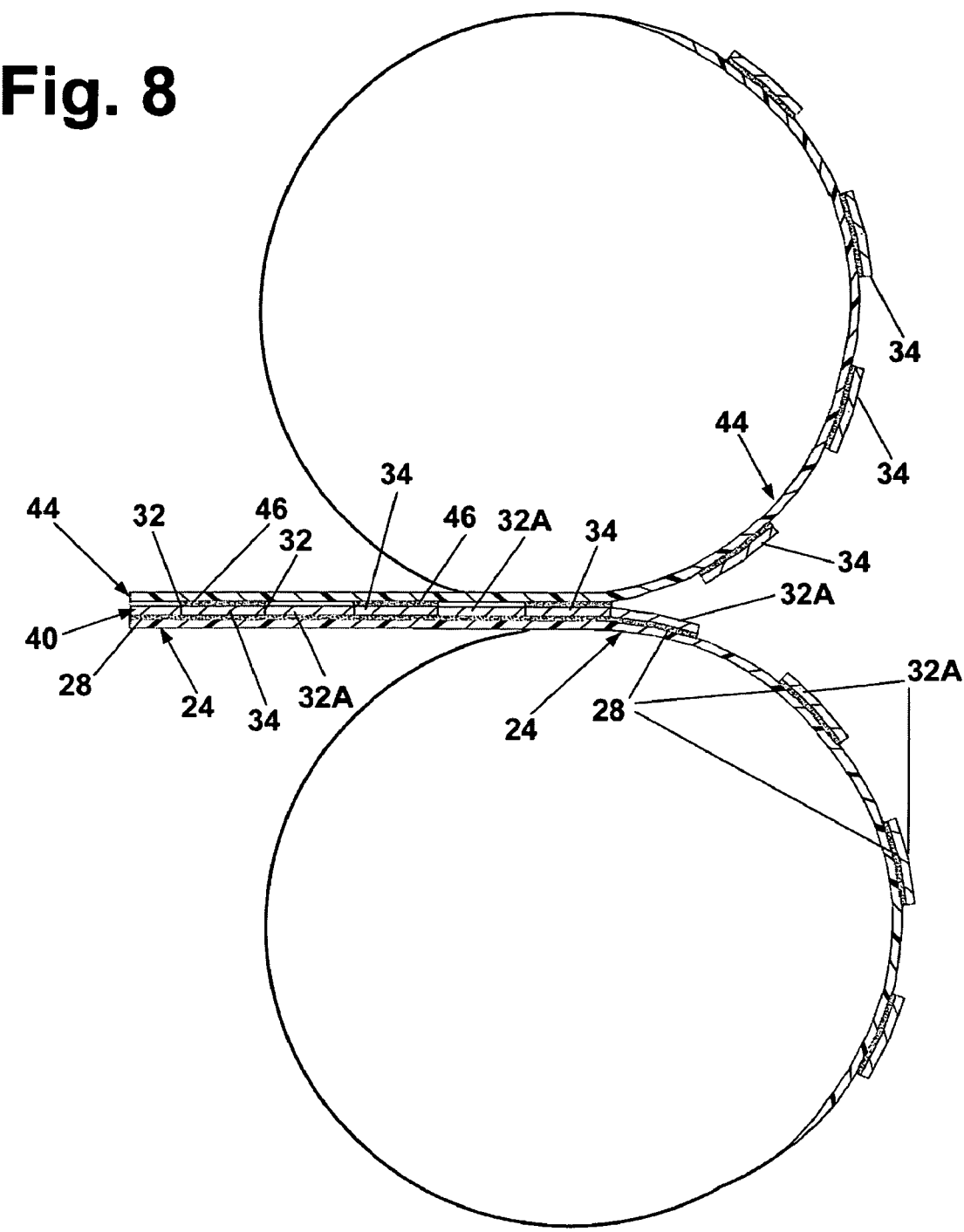
FIG. 8 is an enlarged view of a portion of the system shown in FIG. 6 showing the carrier web with the antennas thereon being reeled up on a take-up reel and the scrap removal web having the scrap material transferred to it being reeled up on another take-up reel.

Operation of the system 20' is as follows. The conductive web 40 and the carrier web 24 are passed as a unit between the die-cutting roller 30A and the backing roller 30B to produce the series of die-cut antennas 32A surrounded by the scrap material of the conductive web 40 as described above with respect to FIG. 5. Since the web of conductive material is not sufficiently strong and robust to enable it to be peeled off of the carrier web 24, the scrap removal web 44 is utilized to remove the scrap material. To that end, the scrap removal web 44 from the roll 42 is juxtaposed with respect to the conductive web 40 on the carrier web 24 and is brought into engagement with the conductive web 40 downstream of the rollers 30A and 30B. The webs are indexed so that the adhesive pattern 46 on the undersurface of the web 44 engages the portion of the conductive web making up the scrap area 34. This action affixes the scrap material 34 to the web 44. The web 44, with the scrap material is then pulled away from the carrier web 24, thereby transferring the scrap material to the web 44, so that it can be reeled up on the take-up reel 36. This action is best shown in the enlarged view of FIG. 8. At the same time, the antennas 32A remain secured to the carrier web 24 by the adhesive 28, whereupon the carrier web with the series of antennas thereon is reeled up on the take-up reel 38.

As should be appreciated by those skilled in the art from the above discussion, the antennas 32A that are on the reeled up carrier web 24 can be readily utilized to form a UHF EAS or RFID tag by removing them from the carrier web 24 and affixing them to whatever portion of the tag is desired. In fact, if desired, the carrier web with the antennas thereon may not be rolled up on a take-up reel, but may be directly brought to a system for making the security tags to provide the antennas therefor. In order to expedite that process, the carrier web, as described earlier includes a silicone surface on which the adhesive 28 is disposed. Thus, when the antennas are removed from the carrier web during the tag fabrication/assembly process, the contiguous portion of the adhesive 28 will be transferred from the carrier web to the antenna, thereby serving as a means for attaching the antenna to whatever portion of the tag is desired as the site for the antenna. In copending U.S. patent application Ser. No. 11/400,932, entitled Transfer Tape Strap Process, filed contemporaneously herewith and which is assigned to the same assignee as this invention and whose entire disclosure is incorporated by reference herein, there is disclosed a system and method for securing antennas to components to form security tags. The antennas made by this invention can be utilized in that process to produce security tags on a very low cost basis.

As should also be appreciated by those skilled in the art the formation of the UHF antennas in accordance with the methods of this invention can be accomplished using standard installed equipment that has been available for several decades in the label converting industry by utilizing an antenna cutting die that is configured to the shape of the antennas to be produced. Thus, a standard production line, like used to make paper or foil labels, but using a web of electrically conductive material releasably adhesively secured to a carrier web and a die that is shaped to cut the desired antennas, can be used to produce UHF antennas on a high speed, very low cost basis. In particular, each antenna shape of a series of antennas can be produced by using the antenna shaped die to cut through the conductive layer on the carrier web but not into the carrier web, removing the waste from around the die-cut antennas on the carrier web, thereby leaving the series of antenna on the carrier web for subsequent use.

While the invention has been described in detail and with reference to specific examples thereof, it will be apparent to one skilled in the art that various changes and modifications can be made therein without departing from the spirit and scope thereof.

What is claimed is:

1. A method of producing a very thin, flexible ultra high frequency (UHF) antenna for an electronic article surveillance (EAS) or radio frequency identification (RFID) tag:
   providing a conductor sheet comprising a layer of electrically conductive material having a top surface and an undersurface, said conductor sheet having a thickness in the range of approximately 5 to approximately 50 microns;
   providing a liner sheet having a top surface;
   disposing said conductor sheet on said liner sheet so that said undersurface of said conductor sheet is releasably secured to said top surface of said liner sheet by an adhesive substantially coextensive with said conductor sheet;
   forming said conductor sheet into a shape desired for said antenna by bringing a cutting die having said desired shape into engagement with said conductor sheet, whereupon said die pierces through said conductor sheet, but not through said liner sheet, thereby creating a die cut antenna having said desired shape releasably secured to said liner sheet; and
   wherein said conductor sheet is in the form of a conductive material web and said liner sheet is in the form of a carrier web, and wherein said method comprises die cutting a series of antennas in said conductive material web but not through said carrier web, whereupon said antennas are surrounded by the portion of said conductive material web outside the peripheries of said series of antennas, said portion of said conductive material web outside the peripheries of said series of antennas constituting scrap material.

2. The method of claim 1 additionally comprising the step of removing said scrap material and leaving said series of antennas releasably secured to said carrier web.

3. The method of claim 2 additionally comprising utilizing a take-up reel to remove said scrap material from said carrier web.

4. The method of claim 2 additionally comprising utilizing a take-up reel to roll up said carrier web with said series of antennas thereon.

5. The method of claim 2 additionally comprising providing another web, said other web having a pattern of adhesive thereon corresponding to the shape of said scrap material, adhesively securing said pattern of adhesive of said other web to said scrap material on said carrier web and moving said other web with respect to said carrier web to remove said scrap material therefrom and to transfer said scrap material to said other web.

6. The method of claim 5 additionally comprising utilizing a take-up reel to reel up said other web with said scrap material thereon.

7. The method of claim 1 wherein said conductor sheet has a top surface and an undersurface and wherein said undersurface of said conductor sheet is secured to a reinforcing sheet, said reinforcing sheet having an undersurface, and wherein said undersurface of said reinforcing sheet is releasably secured to said top surface of said liner sheet by said adhesive, thereby indirectly securing said conductor sheet to said top surface of said liner sheet; and
   wherein said conductor sheet and said reinforcing sheet are in the form of a laminate web and said liner sheet is in the form of a carrier web, and wherein said method comprises die cutting a series of antennas in said laminate web but not through said carrier web, whereupon said antennas are surrounded by the portion of said conductive material web outside the peripheries of said series of antennas, said portion of said conductive material web outside the peripheries of said series of antennas constituting scrap material.

8. The method of claim 7 wherein said conductive sheet comprises aluminum and said reinforcing sheet comprises tissue paper.

9. The method of claim 8 wherein said conductive sheet has a thickness in the range of approximately 5 to 10 microns and said reinforcing sheet has a thickness in the range of approximately 5 to 10 microns.

10. The method of claim 1 additionally comprising removing said antennas from said carrier web, whereupon contiguous portions of said adhesive is transferred to said antennas to enable said antennas to be secured to other components by use of said respective portions of said transferred adhesive.

* * * * *